(12) United States Patent
Garraffa

(10) Patent No.: US 7,686,032 B2
(45) Date of Patent: Mar. 30, 2010

(54) FIRST STAGE SCUBA DIVING REGULATOR HAVING AN INTERMEDIATE PRESSURE SPRING PROTECTED FROM ICE-INDUCED BLOCKAGE

(76) Inventor: Dean R. Garraffa, 15 Nerval, Newport Coast, CA (US) 92657

( * ) Notice: Subject to any disclaimer, the term of this patent is extended or adjusted under 35 U.S.C. 154(b) by 813 days.

(21) Appl. No.: 11/593,419

(22) Filed: Nov. 6, 2006

(65) Prior Publication Data
US 2008/0105308 A1    May 8, 2008

(51) Int. Cl.
*F16K 31/122*    (2006.01)
*A62B 9/02*    (2006.01)

(52) U.S. Cl. .................. 137/375; 137/81.2; 137/505.25; 128/204.29

(58) Field of Classification Search ................ 137/81.1, 137/81.2, 375, 505.25; 128/204.29, 205.24
See application file for complete search history.

(56) References Cited

U.S. PATENT DOCUMENTS

| | | | | | |
|---|---|---|---|---|---|
| 4,230,140 | A | * | 10/1980 | Hart | ........................... 137/81.2 |
| 5,184,609 | A | * | 2/1993 | Hart | ....................... 128/205.24 |
| 5,507,308 | A | * | 4/1996 | Chambonnet | ............... 137/81.2 |
| 5,509,407 | A | * | 4/1996 | Schuler | ................... 128/205.24 |
| 5,685,297 | A | * | 11/1997 | Schuler | ................... 128/205.24 |
| 5,775,368 | A | * | 7/1998 | Morino | ................... 137/505.25 |
| 6,257,275 | B1 | * | 7/2001 | Furbish et al. | ............... 137/505 |
| 7,398,794 | B2 | * | 7/2008 | Semeia | ....................... 137/81.1 |

* cited by examiner

*Primary Examiner*—John Fox
(74) *Attorney, Agent, or Firm*—Leonard Tachner

(57) ABSTRACT

In a scuba diving first stage pressure regulator soft silicone rubber is bonded to the first stage spring to prevent water from freezing between the coils of the spring thereby assuring unrestricted movement of the spring coils even during freezing conditions. By placing a soft molded material bonded directly to the spring surface through the method of chemical and/or mechanical bonding, a soft pliable silicone rubber encapsulates or cocoons the entire area between spring coils and works as a barrier to prevent water from filling the regions between the spring coils and freezing in cold diving conditions. The thickness and volume of the pliable material silicone is not critical as long as the area between the coils is occupied with enough material to prevent ice from forming and otherwise preventing the spring from deflecting. Further, a radial clearance hole is needed to allow the piston to fit inside the silicone bonded spring hollowed center. Any extra area in the spring hole may be filled with a freeze resistant material such as Teflon or silicone grease.

15 Claims, 4 Drawing Sheets

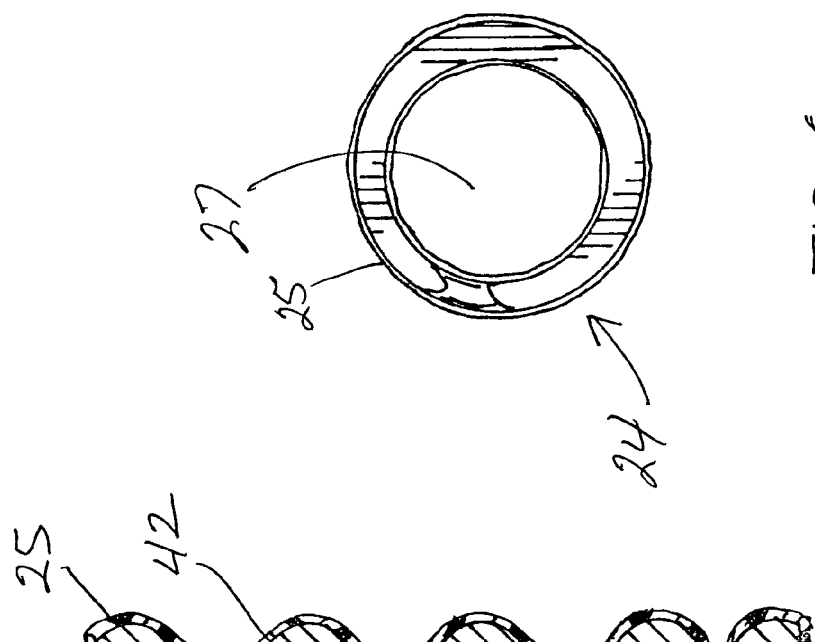
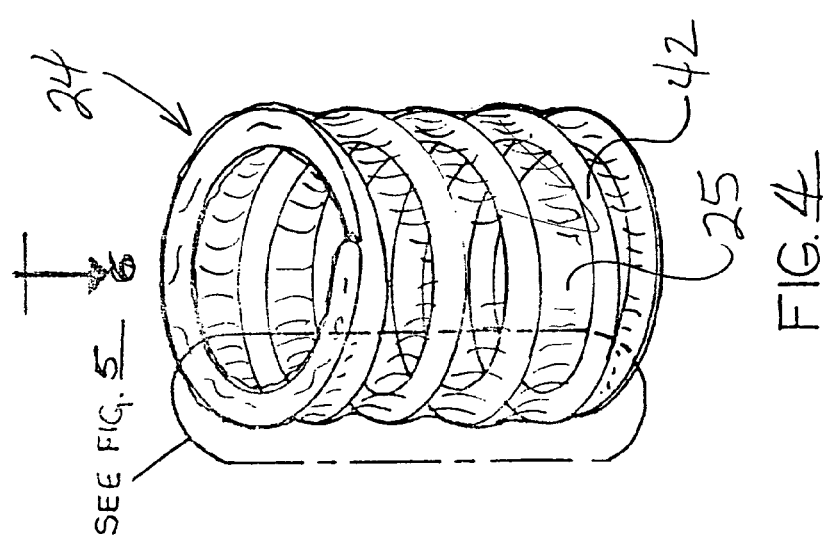
FIG. 6
FIG. 5
FIG. 4

FIRST STAGE SCUBA DIVING REGULATOR HAVING AN INTERMEDIATE PRESSURE SPRING PROTECTED FROM ICE-INDUCED BLOCKAGE

BACKGROUND OF THE INVENTION

1. Field of the Invention

The present invention relates generally to scuba diving first stage pressure regulators. The invention relates more specifically to a silicone or rubber-like material bonded onto a first stage regulator intermediate pressure spring for the purpose of providing freeze protection and to a method of molding silicone or rubber-line material to a compressed first stage spring to eliminate any induced stress added by the material. The use of a flexible membrane or diaphragm used in eliminating water and contamination from entering the ambient pressure cavity where the spring is housed is also described.

2. Background Art

Scuba diving first stage regulators need freeze protection if used in waters lower than 50 degrees Fahrenheit (10 degrees Celsius).

Flow through piston regulators can freeze "open" when used in cold water conditions if not fitted with proper anti-freeze or environmental provisions. When this "open" circuit failing occurs, high-pressure air from the tank travels directly to the second stage without the required low-pressure reduction to 135 PSI. The second stage is now overcome by high-pressure air and free-flows violently and uncontrollably through the diver's mouthpiece.

Just prior to a freeze-related first stage failure, the diver is breathing normally from the second stage. Then a slight free flow of air develops and begins to exit the second stage. This constant flow of air cools the first stage more than normal breathing rates with intermittent cycles. Suddenly, and without warning the flow of air from the mouthpiece is an uncontrolled free flow of air, the diver begins losing his air supply and must immediately ascend to the surface. This is a very traumatic event for the diver.

This freeze up is caused by the following: As high pressure air is reduced to low pressure air inside the first stage regulator, the pressure drop results in breathing air expanding rapidly. As it expands, it cools to sub zero temperatures instantly. This cooling effect is known as the adiabatic process.

Because first stage components are constructed mainly of metals such as brass, stainless steel, or titanium, internal cold air temperatures are conducted away from the critical first stage internal components and into the surrounding water through these metal structures. In some cases, if the surrounding water temperature is below 50 degrees Fahrenheit or (10 degrees Celsius), ice will begin to form on and around critical first stage metal components, specifically inside and between the first stage intermediate pressure spring coils located inside the ambient pressure sending cavity area. Once ice begins to form, the effectiveness of cold thermal transfer is highly diminished.

The first stage regulator spring cavity or ambient chamber is especially prone to freezing water that enters the first stage for the purpose of regulating intermediate pressure over hydrostatic pressure. Just seconds before freezing, the final amount of clearance between the spring coils is displaced by ice and the intermediate pressure spring becomes locked or frozen solid. Because it is now blocked and cannot deflect or close, the first stage starts to fail in the open flow position due to limited piston and spring movement. Restricted forward piston movement results in the open flow path of high-pressure air between the seat and piston, not permitting the shut off position between the piston and the high-pressure seat.

Compressed air exits the scuba diver's air cylinder and tank valve and flows into the first stage regulator as it is reduced from a high "3500 PSI" supply pressure to a low 135 PSI intermediate pressure as it exits the first stage. This intermediate pressure is always regulated to be over hydrostatic pressure or 135 PSI plus the ambient water pressure of 0.445 PSI per foot depth of seawater.

A flow through piston end moves away from a high-pressure seat far enough to allow for the flow of air to occur. As air travels through a hollow stem of the piston to the opposite large diameter side of the piston, it builds in pressure. Pressure is allowed to build behind the larger pressure sending side of the piston while being resisted by a predetermined amount of spring force applied from an intermediate pressure spring. This force is calculated to maintain the desired intermediate pressure of 135 PSI. Once the desired intermediate pressure is reached, the spring force is overcome and the piston travels to close off the piston and high-pressure seat air passage into the hollow piston stem. Airflow is thereby halted for the time being.

The reason the intermediate pressure chamber is open to water contact and how it regulates "over-bottom pressure" may be described as follows: The flow through piston and intermediate pressure spring must work together in order to sense and regulate intermediate pressure to 135 PSI over ambient water pressure or over-bottom pressure at all depths to which the diver descends or ascends. To accomplish this, the piston and spring design must add or subtract 0.445 PSI for each foot depth of seawater to maintain the 135 PSI over ambient hydrostatic pressure.

If the intermediate pressure chamber is sealed dry and no pressure transmitting forces can register on the piston, the first stage intermediate pressure cannot correct to surrounding hydrostatic pressure, thus flow and output are diminished.

One method used to prevent water from freezing inside the ambient chamber is to keep the chamber dry. This is very logical but very difficult to accomplish. One design creates a very small hole through the piston head to allow intermediate pressure to communicate into the ambient pressure chamber while still keeping it dry. Inside the chamber, a small pressure over the surrounding water pressure is allowed to build and overcome a rubber check valve where air exits the first stage. The stream of small bubbles exiting the check valve appears to other divers as an o-ring leak. This method of keeping the chamber dry is a marketing challenge for the maker.

The prior art attempts to thermally isolate the cold transfer by blocking the path of cold air flowing through the piston stem. Unfortunately, under freezing conditions, the spring coils will form with ice and fail due to this blockage. Water must be prevented from entering the ambient pressure chamber and freezing between the coils of the intermediate pressure spring to eliminate the potential for freezing. Prior art attempts to thermally isolate cold from the intermediate pressure spring does not address the issue of water entering the intermediate pressure cavity and freezing between the spring coils. Such attempts only prolong the time required to freeze the water.

If water is allowed to enter the regulator first stage ambient spring cavity of body during freezing conditions (such as where surrounding water temperature is 50 degrees Fahrenheit or 10 degrees Celsius, or lower), the adiabatic condition will super cool the regulator first stage to the point where ice forms on the internally located first stage spring. As ice formation increases, a solid bridge of ice will form between the spring coils. As the ice hardens, the coils become linked together and solid ice prevents the spring form compressing or deflecting.

What is needed therefore is a way to prevent water from entering and forming ice between the coils of the intermediate pressure spring or inside the ambient pressure cavity.

SUMMARY OF THE INVENTION

In the present invention soft silicone rubber is bonded to the first stage spring to prevent water from freezing between the coils of the spring thereby assuring unrestricted movement of the spring coils even during freezing conditions.

By placing a soft molded material bonded directly to the spring surface through the method of chemical and/or mechanical bonding, a soft pliable silicone rubber encapsulates or cocoons the entire area between spring coils and works as a barrier to prevent water from filling the regions between the spring coils and freezing in cold diving conditions.

The thickness and volume of the pliable material silicone is not critical as long as the area between the coils is occupied with enough material to prevent ice from forming and otherwise preventing the spring from deflecting. Further, a radial clearance hole is needed to allow the piston to fit inside the silicone bonded spring hollowed center. Any extra area in the spring hole may be filled with a freeze resistant material such as Teflon or silicone grease.

In addition to bonding the spring with a pliable silicone material that encapsulates or cocoons the entire spring to prevent freezing, a flexible diaphragm or membrane may be employed and secured to the first stage body to function as a barrier to resist water and debris from entering the ambient pressure cavity. With this optional flexible diaphragm, no exchange of water or contamination is permitted inside the first stage. This further reduces the chance of freezing.

Because the internal volume of the intermediate cavity is displaced by the flow-through piston, the intermediate pressure spring bonded with soft silicone, and spring pressure shims, most of the internal air spaces are now displayed by non-compressible solids. Some small amount of air or freeze resistant transmitting fluid such as Teflon or silicone grease is needed to communicate surrounding ambient water pressure through the flexible diaphragm and directly onto the piston, for the main purpose of regulating of first stage intermediate pressure. Because silicone or a soft rubber-like material is molded to and between the coils of a precision pressure spring the first stage, it is very important to consider the spring's load tolerance. Interference could be caused by the silicone material now bonded between the coils of the spring if the compression and deflection rate of the spring are restricted by the flexible but non-compressible silicone rubber material situated between the spring coils. A dramatic spring rate change could occur causing fluctuations to the desired the load rate of the spring and thus changes to intermediate pressure stability.

In order to remove any added resistance or compressive stresses to the spring that could occur as a result of molding any materials between the coils of the spring, a molding method is needed to eliminate interference between the spring coils.

In the preferred method for the molding of the silicone material, the spring is placed into an open silicone compression or injection mold and is ready to receive silicone bonding. As the mold closes, the spring is compressed from its free length condition to the proper load height of the spring.

As the molding cycle begins, viscous silicone material flows into the mold and between narrowed spring coils. The material starts to cure or "set" directly to the compressed spring. When the curing cycle is complete, the mold opens and the spring is relaxed and allowed to return to its normal free length. The permanently cured silicone material that is now bonded to the spring, will stretch and yield as the coils return to the free length of the spring. The cured silicone material looks stretched and taut between the spring coils in the free length condition.

As the spring is assembled into the first stage and tightened to the correct assembled height, the silicone material will be significantly less stretched. Additionally, when the first stage is pressurized with air and the piston travels forward to make contact with the high-pressure seat, it will now have no added silicone induced stresses and the spring will be at the proper working height and the silicone material is static, thus the first stage intermediate pressure is stable.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which:

FIG. 4 is a perspective view of the intermediate pressure spring of the invention shown after encapsulation with bonded silicone rubber or other soft pliable material;

FIG. 5 is a cross-sectional view of the encapsulated spring coils; and

FIG. 6 is an axial view of the encapsulated spring of the preferred embodiment.

DETAILED DESCRIPTION OF A PREFERRED EMBODIMENT

Referring to the accompanying drawings, it will be seen that a first stage pressure regulator 10 according to the present invention is a type of balanced regulator which uses a piston 22 to receive compressed air at a high pressure up to 300 Bar (4350 psi) and provide an intermediate pressure at 135 psi over ambient. The piston is of a flow through or hollow stem design having a large sensing end and a smaller valve seating end. The piston is designed for limited travel toward and away from the valve seat 36. Travel toward the valve seat is resisted by the intermediate pressure spring 24. The piston moves away from the high pressure seat a sufficient distance to permit a free flow of air through the stem and toward the sensor end. As the air flow continues, pressure builds at the pressure sensing end and tends to force the piston toward the high pressure seat against the intermediate spring compression force until airflow is halted by the seating of the smaller end of the piston against the high pressure seat. The spring 24 and piston 22 are carefully designed so that the lower pressure end of the regulator is at 135 psi regardless of the magnitude of the air pressure at the high pressure end.

Figure 1:
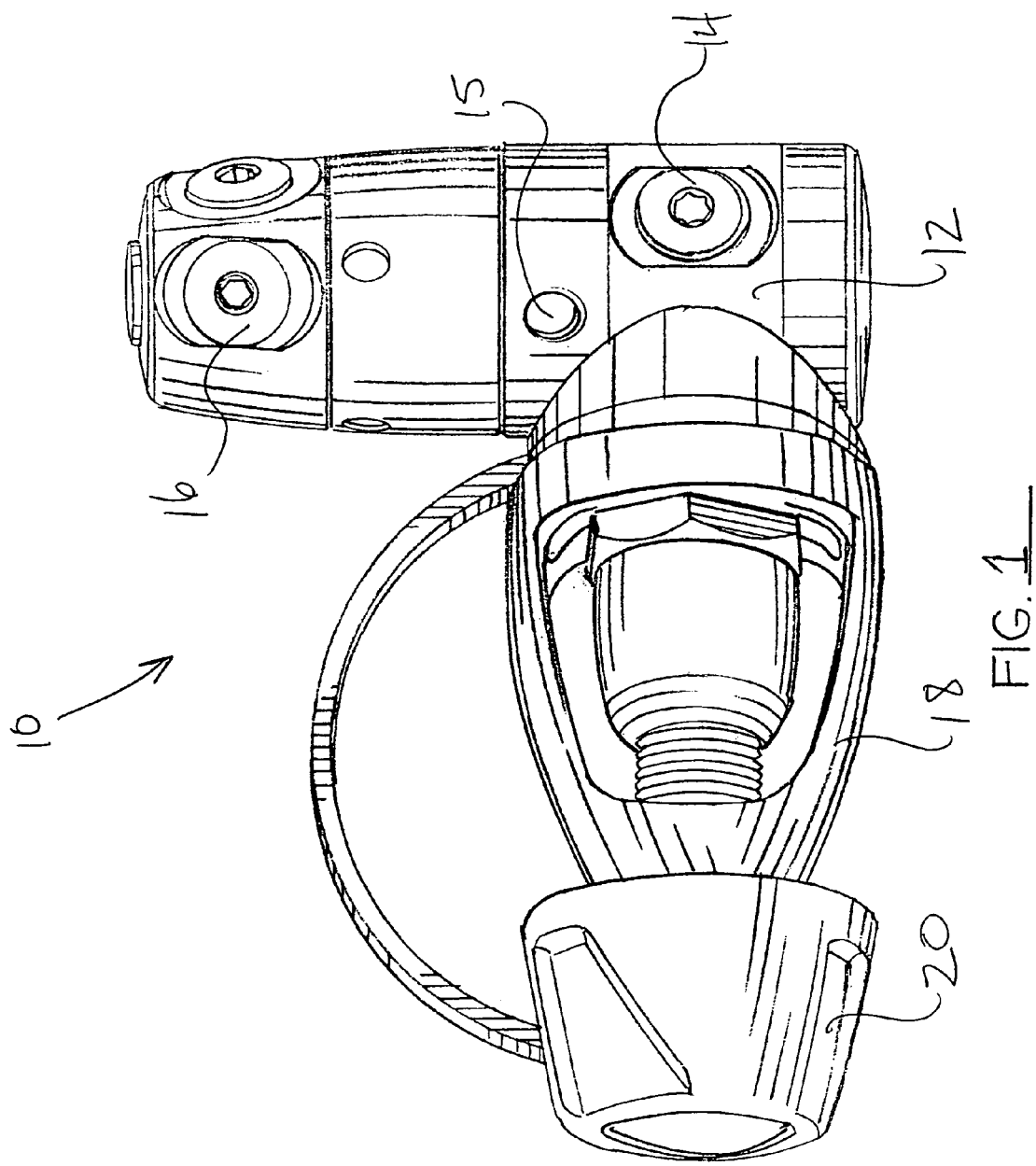
FIG. 1 is a drawing of an assembled first stage regulator of a preferred embodiment of the present invention shown ready for connection to one or more tanks of compressed air.
Figure 2:
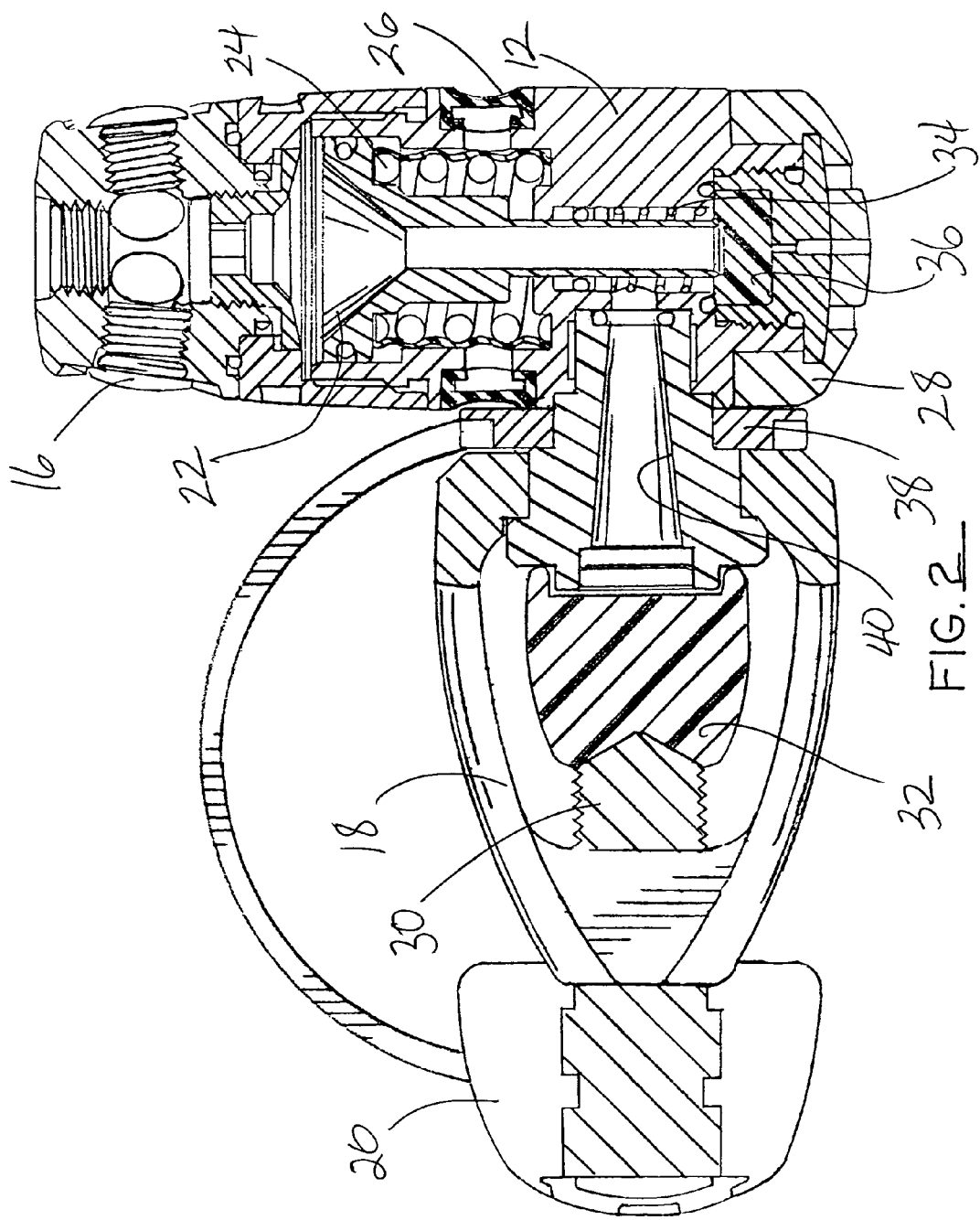
FIG. 2 is a cross-sectional drawing of the first stage regulator of FIG. 1.
Figure 3:
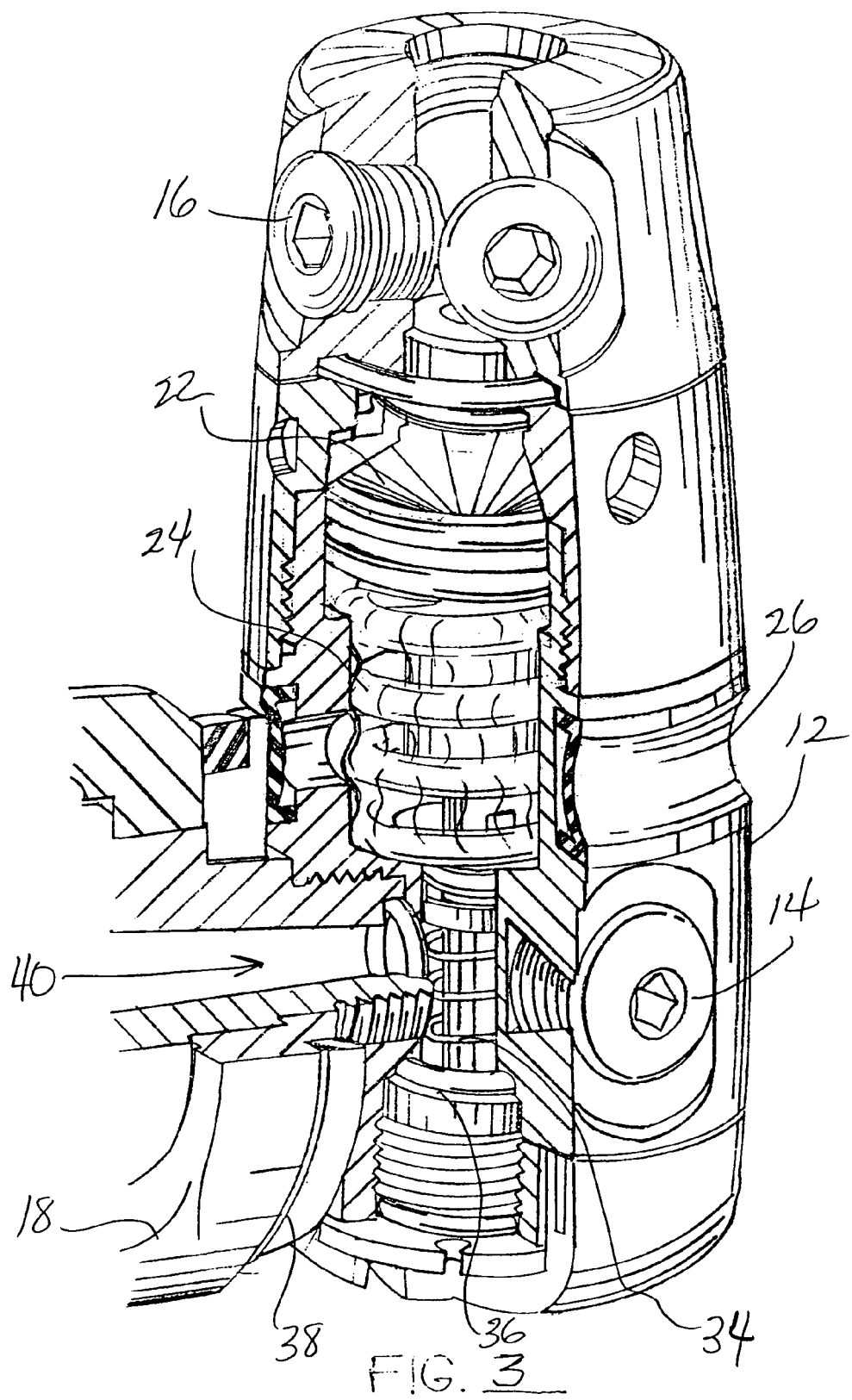
FIG. 3 is an enlarged cutaway view of the main body of the regulator of FIG. 1 showing the pressure-regulating cavity thereof.

Operation of balanced piston-type first stage regulators is well-known in the scuba diving art and need not be described herein in further detail. However, for the purpose of providing a sufficient description herein, the general structure of the regulator will be described. As seen in FIGS. 1-3, first stage regulator 10 comprises a body 12 having a high pressure end characterized by one or more high pressure ports and plugs 14 and a low pressure end characterized by a plurality of low pressure ports and plugs 16. The body 12 is configured for connection to at least one tank of compressed air (not shown) by a series of components including a yoke 18, a nipple 30, a handwheel 32 and a saddle 38. A dust cap 20 protects the nipple 30 and its interior inlet 40 until the regulator is connected to the tank connector. A smaller spring 34 stabilizes the valve seat 36 and an end cap 28 seals the high pressure end of the regulator. An environmental seal 26 surrounds the exterior surface of the regulator over ambient pressure holes 15 to communicate ambient pressure into the interior cavity while minimizing contamination from debris in the surrounding sea water.

Referring to FIGS. 4, 5 and 6, it will be seen that the intermediate pressure spring 24 is fully encapsulated by a bonded silicone rubber cocoon 25 which adheres to each individual spring coil 42, but which leaves an open hollow center 27 for receiving the piston 22. It will be observed that the silicone rubber 25 cocoon occupies the spaces between the coils 42 so that ice cannot block those spaces and thus prevent compression of spring 24 which as previously described, could prevent proper seating of the smaller end of the piston 22 against the valve seat 36. As also previously alluded to, the silicone rubber 25 is bonded to the spring 24 while the spring is subjected to a selected compression force. This method of bonding is an important aspect of the present invention. By compressing spring 24 during the bonding step, the silicone rubber will not itself affect the compressibility of the spring within the range of spring compressive movement used to balance the piston 22 which could otherwise alter the calibration of the pressure regulation and disadvantageously change the pressure at the low pressure ports of the regulator. After the silicone rubber is fully cured, the spring is allowed to relax and thereby place the silicone rubber in a taut or expanded condition which, of course, does not affect the calibration of the regulator.

Having thus disclosed a preferred embodiment of the present invention, it will now be apparent to those having skill in the art of scuba diving equipment and in the art of regulators in particular, that the unique structure and process disclosed herein has the important benefit of preventing the formation of ice in a first stage regulator from significantly interfering with the operation of the intermediate pressure spring. It will now also be apparent that various other materials besides silicone rubber would be suitable for the indicated purpose and that there may also be other alternatives for placement of the material in relation to the spring as well as for the process of applying such materials. Therefore, the present invention should not necessarily be deemed to be limited by the disclosed details of the preferred embodiment but only by the appended claims and their equivalents.

I claim:

1. An improved first stage scuba diving regulator of the type having a balanced piston configuration wherein a piston having a hollow stem seating end and a larger pressure sensing end moves toward and away from a valve seat depending upon sensed intermediate pressure and resistance of a spring; seating of the piston seating end preventing air flow through the stem and unseating of the piston seating end permitting air flow through the stem to maintain a substantially constant desired intermediate pressure at said sensing end of said piston despite variation in high pressure air input to said regulator; the improvement comprising:

said spring being encapsulated in a cocoon of pliable rubber-like material to prevent the accumulation of ice between coils of said spring which would otherwise prevent compression of said spring to permit seating of said piston when said intermediate pressure reaches said desired pressure.

2. The improvement recited in claim 1 wherein said pliable rubber-like material is silicone material.

3. The improvement recited in claim 1 wherein said pliable rubber-like material is bonded to said spring.

4. The improvement recited in claim 1 wherein said pliable rubber-like material is bonded to individual coils of said spring and extends between said coils.

5. The improvement recited in claim 1 wherein said pliable rubber-like material is in a condition of tension when said spring is in a relaxed state and becomes less tensed as said spring is compressed.

6. The improvement recited in claim 1 wherein said pliable rubber-like material is bonded to said spring while said spring is compressed.

7. The improvement recited in claim 1 wherein said piston is in fluid communication with ambient pressure surrounding said regulator, said fluid communication being maintained through ambient pressure holes in the body of said regulator.

8. The improvement recited in claim 7 wherein said ambient pressure holes are covered by an environmental seal surrounding said regulator body for resisting the entry of debris through said ambient pressure holes.

9. A first stage pressure regulator for scuba diving and having a compressible spring and a piston, the piston having a pressure sensing end and a seating end interconnected by a flow-through stem, the spring resisting movement of the piston toward a valve seat for terminating air flow through the stem and toward the pressure sensing end of the piston until a desired intermediate pressure is achieved at the sensing end; the regulator comprising:

a spring encapsulated in a pliable rubber-like material including between coils of said spring to prevent the formation of ice between said coils which could otherwise prevent compression of said spring and thus seating of said piston seating end in said valve seat for terminating air flow.

10. The first stage regulator of claim 9 wherein said pliable rubber-like material comprises silicone rubber.

11. The first stage regulator of claim 9 wherein said pliable rubber-like material is bonded to said spring.

12. The first stage regulator of claim 9 wherein said pliable rubber-like material is in a state of tension while said spring is relaxed and becomes relaxed when said spring is compressed.

13. A method of preventing ice formation from affecting performance of a first stage pressure regulator used for scuba diving and having a compressible spring and a piston, the piston having a pressure sensing end and a seating end interconnected by a flow-through stem, the spring resisting movement of the piston toward a valve seat for terminating air flow through the stem and toward the pressure sensing end of the piston until a desired intermediate pressure is achieved at the sensing end; the method comprising the steps of:

a) placing said spring in a state of compression;
b) bonding a rubber-like material to said spring until said spring is encapsulated by said material;
c) allowing said rubber-like material to cure; and
d) releasing said encapsulated spring from said compression.

14. The method recited in claim 13 further comprising the steps of:

e) placing said encapsulated spring around the stem of said piston within said regulator; and f) filling the area between the spring and the piston stem with freeze resistant material.

15. An improved first stage scuba diving pressure regulator having an intermediate pressure spring resisting closure of a valve for terminating air flow when a desired intermediate pressure is achieved; the improvement comprising:

said intermediate pressure spring being encapsulated in a pliable rubber-like material including between coils of said spring to prevent the formation of ice between said coils which could otherwise prevent compression of said spring and termination of said air flow at said desired intermediate pressure.

* * * * *